Patented Dec. 7, 1948

2,455,405

UNITED STATES PATENT OFFICE 2,455,405

PREPARATION OF MONOCHLOROACETIC ACID

Lawton A. Burrows, Mendenhall, Pa., and Mack F. Fuller, Woodbury, N. J., assignors to E. I. du Pont de Nemours & Company, Wilmington, Del., a corporation of Delaware No Drawing. Application October 17, 1946, Serial No. 703,710

9 Claims. (Cl. 260—531)

This invention relates to a process for the manufacture of monochloroacetic acid by the oxidation of ethylene chlorohydrin by means of nitric acid.

Chloroacetic acid is an organic intermediate of considerable industrial importance and has been prepared by various methods in the past, principally by chlorination procedures. None of the methods of the prior art have been wholly satisfactory, however, from the viewpoint of economics, quality and purity of the product, etc.

An object of the present invention is a novel and improved method for the manufacture of monochloroacetic acid characterized by simplicity of operation, very favorable yields, and high purity. A further object is a method for the production of monochloroacetic acid by the nitric acid oxidation of ethylene chlorohydrin. Additional objects will be disclosed as the invention is described more at length in the following.

We have found that the foregoing objects are accomplished when we react ethylene chlorohydrin and nitric acid, the latter being of a concentration between 15% and 90% HNO$_3$. Under the conditions employed, monochloroacetic acid is formed in good yields, and may be readily separated from the residual acid.

The following examples are specific embodiments of procedures followed in carrying out the invention but will be understood to be illustrative only and not limiting in any way.

Example 1

Nitric acid of 60% strength and in the amount of 2000 grams was introduced into a 2-liter flask equipped with agitator and reflux condenser. Nitrogen tetroxide in the amount of 5 cc. was added, and the acid was heated to around 60° C. Ethylene chlorohydrin in the amount of 200 grams was fed slowly into the heated acid over a 2-hour period, the temperature being maintained at 60° C. by means of cooling water. After the addition had been completed, the reaction mixture was heated for an additional 30 minutes at 60° C., then for 30 minutes at 75° C.

The water and residual nitric acid were removed by distillation under reduced pressure, a maximum temperature of 80° C. being used. Molten monochloroacetic acid remained behind, which was recovered and purified by distillation at atmospheric pressure. An 84% yield of product was obtained, having a melting point of 62° C. and a boiling point of about 189° C. (105° C. at 20 mm.).

Example 2

A similar run was carried out in which 1000 grams of 60% nitric acid was introduced into a reaction flask, 19 grams of NO$_2$ added, and the mixture heated to 60° C. A 42% aqueous solution of chlorohydrin in the amount of 238 grams was added over a 2¾ hour period, the temperature being maintained at 60° C. After addition was complete, the reaction mixture was heated for a further period of 1¼ hours at 60° C. The water and acid were removed as in Example 1, and the chloroacetic acid obtained by distillation, a yield of 89.3% being obtained.

Example 3

Nitric acid of about 60% strength and in the amount of 23.0 pounds was introduced into a pressure-resistant vessel, and 0.4 pound of NO$_2$ was added. The mixture was heated to 60° C. and 2.98 pounds of anhydrous ethylene chlorohydrin was fed in gradually, the net ratio of 100% HNO$_3$ to chlorohydrin being 4.65. The pressure within the reactor rose to around 80 pounds per square inch. The total time of feeding and maintaining the mixture at 60° C. was 1 hour, after which water and acid were removed and chloroacetic acid obtained. A yield of 90.2% of chloroacetic acid was obtained.

Example 4

Using the same amounts and concentrations of reactants as in Example 3, substantially the same procedure was followed except that air was introduced into the autoclave at the start to give a pressure of 150 pounds per square inch, which dropped to 140 pounds during the first half of the feed, then rose to 155 pounds. A yield of 90.7% of chloroacetic acid was obtained.

In carrying out our process, we employ aqueous nitric acid of a concentration between 15% and 90% HNO$_3$, and preferably between 25% and 75%. While it is not essential, we desirably maintain an initial concentration of nitrogen tetroxide in the acid in order to accelerate the reaction immediately.

The reaction may be carried out at any temperature above atmospheric but desirably at a temperature such that the reactants are in liquid form. Preferably we maintain a temperature of around 50° to 75° C. The examples have shown operation of the process at both atmospheric and super-atmospheric pressures and our preferred procedure is to carry out the process under super-atmospheric pressure, for example between 1 and 20 atmospheres. We may also find it desirable to introduce oxygen or oxygen-containing gases during the oxidation reaction, as shown in Example 4, in order to promote the oxidizing power of the nitric acid.

The processes described in the examples have illustrated batch procedures. The invention is excellently adapted also to continuous operation, however, and it will be understood that both types of process are included. With a continuous process, the addition of $NO_2$ would doubtless not be necessary.

The present invention discloses a method possessing marked advantages over those of the prior art. Both reagents are economically attractive, and the good yields obtained and the degree of completion of the reaction by a simple procedure make the process very attractive. A further advantage lies in the high purity of the product obtained, namely over 99% monochloroacetic with no dichloro- or trichloroacetic acids present, as are obtained in the processes of the prior art.

While the invention has been disclosed clearly and its advantages shown plainly in the foregoing, it will be understood that many variations in details of operation and conditions may be introduced without departure from the scope of the invention.

We intend to be limited only by the following claims.

We claim:

1. A process for the manufacture of monochloroacetic acid, which comprises reacting ethylene chlorohydrin and nitric acid.

2. A process for the manufacture of monochloroacetic acid, which comprises reacting in liquid phase ethylene chlorohydrin and nitric acid of a concentration between 15% and 90% $HNO_3$.

3. The process of claim 2, in which the nitric concentration is between 25% and 75% $HNO_3$.

4. The process of claim 2, in which the oxidation reaction is carried out under pressure greater than atmospheric.

5. The process of claim 2, in which the ethylene chlorohydrin is added gradually to the aqueous nitric acid.

6. The process of claim 2, in which an initial content of nitrogen tetroxide is maintained in the reaction mixture.

7. The process for the manufacture of monochloroacetic acid, which comprises introducing nitric acid of a concentration between 15% and 90% $HNO_3$ into a reactor, adding ethylene chlorohydrin thereto gradually, maintaining the reactants in liquid form at an elevated temperature throughout the reaction, and separating the monochloroacetic acid from the residual acid solution.

8. The process of claim 7, in which a temperature of between 50° C. and 75° C. is maintained during the reaction.

9. A process for the preparation of monochloroacetic acid which comprises reacting ethylene chlorohydrin and nitric acid with the introduction of an oxygen-containing gas.

LAWTON A. BURROWS.
MACK F. FULLER.

REFERENCES CITED

The following references are of record in the file of this patent:

UNITED STATES PATENTS

| Number | Name | Date |
| --- | --- | --- |
| 1,982,160 | Guinot | Nov. 27, 1934 |
| 2,298,387 | Kenyon et al. | Oct. 13, 1942 |

OTHER REFERENCES

Claus: Ber. Deut. Chem., vol. 5, p. 355 (1872).
Otto: Liebig's Annalen der Chemie, vol. 239, p. 258 (1887).